M. H. MANN.
PAY ROLL ACCOUNTING AND PAYING MACHINE.
APPLICATION FILED MAR. 16, 1918.

1,311,174.

Patented July 29, 1919.
5 SHEETS—SHEET 1.

WITNESS:
EdWagner

INVENTOR
M. H. Mann
BY
J. F. Robb
ATTORNEY

M. H. MANN.
PAY ROLL ACCOUNTING AND PAYING MACHINE.
APPLICATION FILED MAR. 16, 1918.

1,311,174.

Patented July 29, 1919.
5 SHEETS—SHEET 4.

WITNESS:
E. H. Wagner,

INVENTOR
M. H. Mann
BY J. H. Robb
ATTORNEY

UNITED STATES PATENT OFFICE.

MILES H. MANN, OF READING, PENNSYLVANIA.

PAY-ROLL ACCOUNTING AND PAYING MACHINE.

1,311,174.    Specification of Letters Patent.    Patented July 29, 1919.

Application filed March 16, 1918. Serial No. 222,919.

*To all whom it may concern:*

Be it known that I, MILES H. MANN, a citizen of the United States, residing at Reading, in the county of Berks and State of Pennsylvania, have invented certain new and useful Improvements in Pay-Roll Accounting and Paying Machines, of which the following is a specification.

The present invention comprises improvements in payroll machines of the accounting and money paying type shown and described in U. S. patents of Runquist, #1,195,860, issued August 22d, 1916, and White #1,249,869, issued December 11, 1917. Machines of the "international" type set forth in these Letters Patent comprise an adding machine adapted to work conjointly with paying out mechanism so that amounts set up on the adding machine are paid out from the paying section incidental to the operation of the adding machine. Provisions are had for the disabling of the paying mechanism so that the accounting or adding machine may work alone.

While the type of payroll machine referred to is susceptible of operation by a single operator highest efficiency is attained when two operators therefor are employed, one to work the accounting machine, and one to feed envelops to the paying mechanism to receive the money as it is paid out by the latter. Owing to the conjoint operation of the adding and paying out mechanisms, experience has shown that if the adding machine is worked too fast by its operator money may be paid out by the paying section faster than the operator of the latter is able to place the pay envelops in position to receive the money ejected. The foregoing condition makes necessary special attention of the operators to avoid likelihood of ejection of money accidentally previous to placing of pay envelops in position to receive the same and the primary purpose of the present improvements has been to establish on the paying section a controlling device for locking the main actuator of the accounting machine against operation until the operator attending to the paying section has placed in position the pay envelop to receive the money ejected from said section. Subsidiary to the foregoing I have so designed my control mechanism on the paying section that it operates to release the main actuator of the adding machine as an incident to the movement of the hand of the operator in carrying a pay envelop to money receiving position relatively to the paying section.

To meet the condition that at times the payroll machine will be operated by a single operator, my invention includes provisions to render inactive the control mechanism on the paying section so long as the second operator is dispensed with, or may not be in attendance at the machine temporarily or otherwise.

Disabling means being provided to render inoperative the paying section of the payroll machine, and it being obvious that under such condition of disablement, the second operator controlling means of this invention is without utility, my present improvements include means to incapacitate said control mechanism when the paying section aforesaid is not in use; otherwise the adding or accounting machine would be locked against its independent operation, something, of course, which must be prevented.

The present invention includes additionally, other detail features of improvement in construction which will appear more fully hereinafter and among which are special provisions for locking the main actuator of the accounting machine when the money in the paying section is depleted to a predetermined minimum; provision to render the locking means of the main actuator inactive on removal of the money holder of the paying section, and a provision whereby certain parts of the control mechanism may be separated to facilitate ready removal of a paying out chute intended to be separable from the machine.

In the accompanying drawings—

Throughout the following detail description and on the several figures of the drawings, similar parts are referred to by like reference characters.

Figures 3, 7, 8, 9:
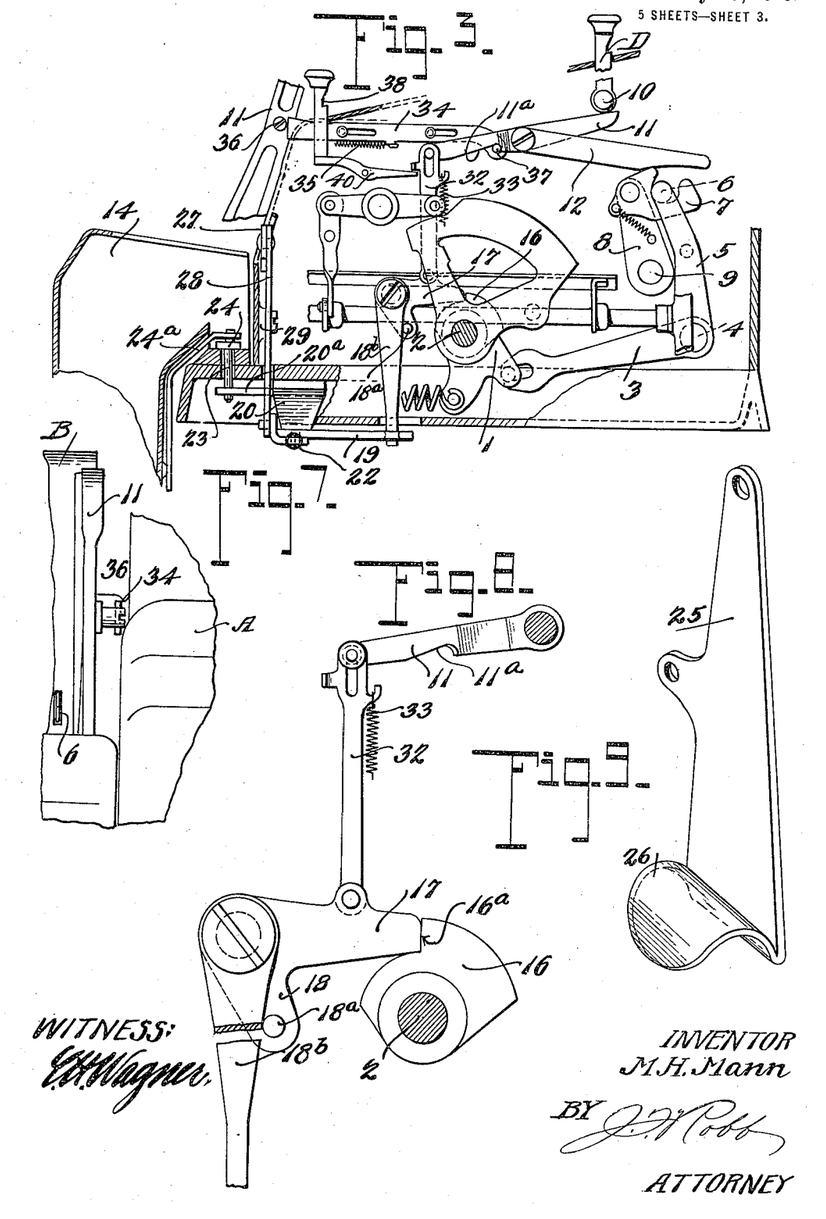
Fig. 3 is a fragmentary view showing in elevation the locking contrivances and manual devices for disabling same.
Fig. 7 is a fragmentary front view showing more clearly the form of the screw stud on the money holder or magazine engageable with the actuating slide on the accounting machine frame.
Fig. 8 is an enlarged view of the locking device.
Fig. 9 is a detail perspective view of the controlling pressure piece, or handle.

Owing to the presentation of the construction of the payroll machine in the Letters Patent previously referred to it suffices to indicate that the adding or accounting machine is denoted A in the drawings and the paying section or mechanism associated therewith is designated B. The accounting machine is operated by a main actuator or handle C and the ejecting mechanism of said paying section is operated through the provision of a rocking arm 1 on the main actuator shaft 2, said arm engaging the bifurcated arm 3 on a stud shaft 4, see Fig. 3. The shaft 4 carries an arm 5 having a stud 6 engaged by a hook 7, said hook being carried by the arm 8 directly fixed to an ejector shaft 9. The parts are connected as seen in Fig. 3 when the paying section B is being operated conjointly with an incident to the operation of the adding machine A by the handle C or any actuating means provided for said machine A. If the disabling key D seen in Fig. 3 is depressed, a stud 10 at its lower end engages the lever 11 connected with an arm 12, the latter being engageable with the hook 7. In this manner the hook 7 may be lowered so as not to engage the stud 6 whereupon the paying or ejecting mechanism of the section B will remain inactive during operation of the accounting machine A.

The paying section B involves a detachable coin holder or magazine 13 of known type and a removable discharge chute 14 well shown in the Runquist patent previously mentioned and suitably equipped with an envelop chute $A^{939}$ of tapered form so as to enter a pay envelop and cause coins discharging therethrough to be received in such envelop. The envelop is usually forced over the chute $A^{939}$ in the well known manner and the latter enters the mouth of the envelop.

*Main actuator lock.*

Figure 1:
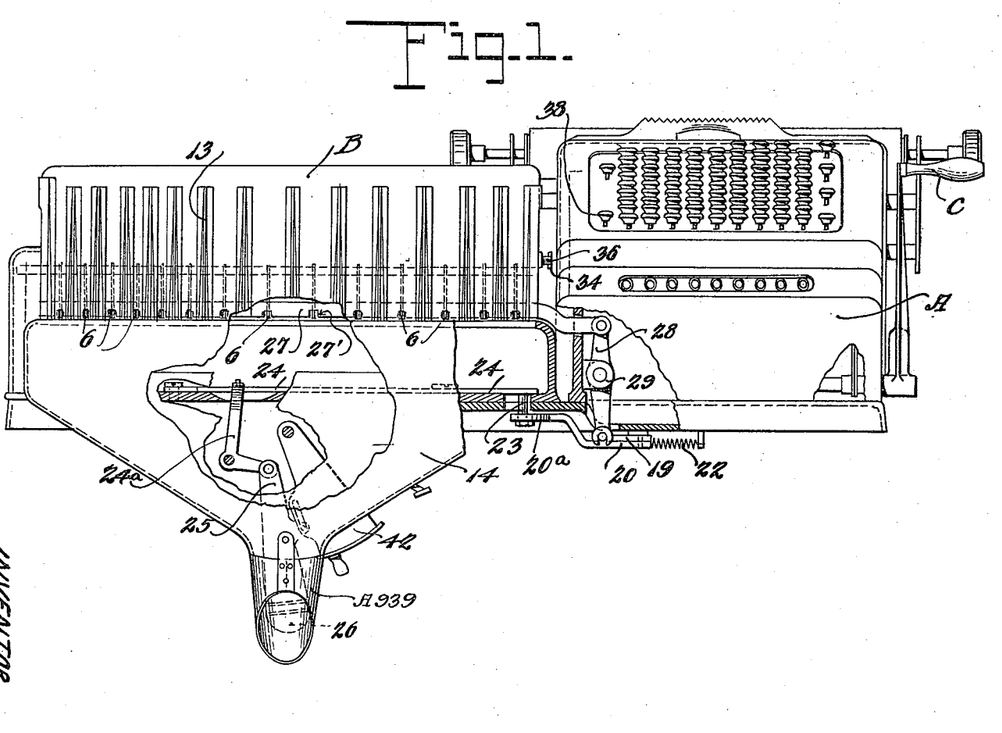
Figure 1 is a front view of a payroll machine embodying the invention.
Figure 10:
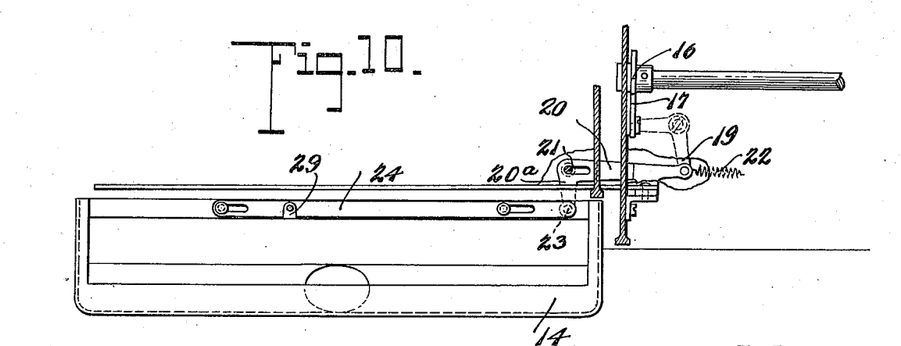
Fig. 10 is a horizontal sectional view, partly broken away showing the detent bar and certain lever connections.
Figure 11:
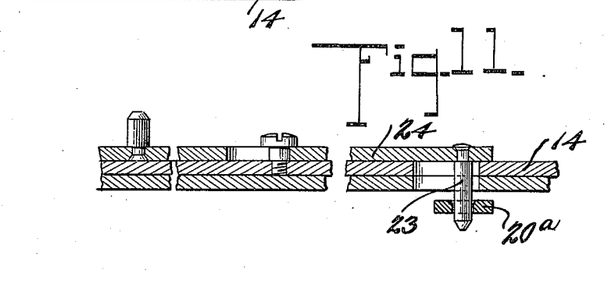
Fig. 11 is a fragmentary, vertical sectional view showing clearly the detachable connections between the actuating bar and the slidable link parts.

This lock is best seen in Figs. 3 and 8. It comprises a segment shaped abutment 16 having the shoulder $16^a$ engageable by a pivoted dog 17 from which extends a short arm 18. The lower end of the arm 18 has a stub $18^a$ engaged with an arm $18^b$ pivoted coaxially with the dog 17. The arm $18^b$ is engaged at its lower end in an opening of a bell crank lever 19 seen best in Fig. 10. The other arm of the lever 19 is connected with a link 20 slidable longitudinally and supported by a stud 21 passing through a slot therein. Normally a spring 22 connected with said link 20 holds the parts so that the dog 17 is free to engage the abutment 16. The parts thus far described are supported upon the accounting machine section of the payroll machine but one end of the link 20 has an arm $20^a$ extending beneath the upper portion of the money chute 14 and has an opening to receive a stud 23 projecting downward from an actuating bar 24 which is mounted to slide lengthwise in the upper rear portion of said chute 14. The bar 24 projects a little beyond the central portion of the chute 14 and is engaged by the vertical arm of a bell crank lever $24^a$ pivoted to the back of said chute as seen best in Fig. 4. The lower lateral arm of the lever $24^a$ is pivotally connected with the controlling pressure piece or handle 25 formed as seen in Fig. 9 with a rearwardly and upwardly curving extension 26. The member 25 is so arranged that as the operator's hand holding a pay envelop is raised to fit the envelop over the envelop chute $A^{939}$, said hand will abut with the finger piece 26 and raise the handle or pressure piece 25. In this manner the parts 25 and $24^a$ are actuated to slide the link 20 leftward as seen in Fig. 1, raising the locking dog 17 and releasing the main shaft 2 of the accounting machine A. Until such releasing action is effected, except as later described herein, the operator who is working the accounting machine is unable to effect operation of the latter through its handle C or whatever may be its operating means, a clutch bar being often used for the controlling function of the handle C in motor driven accounting machines.

Assuming that the paying end of the machine is being worked by a special or second operator it becomes obvious how the operator attending to the accounting machine A is prevented from operating said machine until his associated helper has placed a pay envelop in position on the chute A$^{939}$ ready to receive the amount to be ejected on movement of the handle C.

*Money replenishment control devices.*

Figure 2:
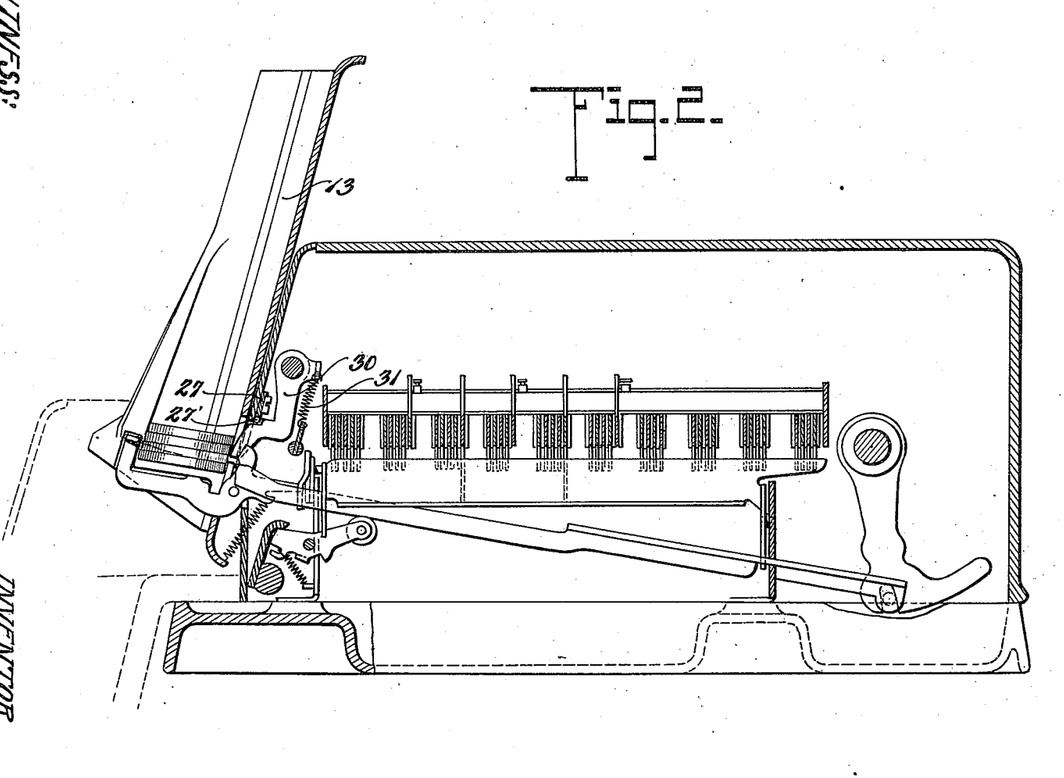
Fig. 2 is a transverse sectional view through the paying section of the machine.

Figs. 1, 2, 5 and 6 disclose that there is mounted on the paying section B in rear of the uppermost portion of the chute 14 and in rear of the coin holders of the magazine 13, a detent bar 27. The said detent bar 27 is formed with notches 27' on its lower edge and is connected at one end with an approximately vertical lever 28 at the upper end of the latter. The lever 28 is pivoted to a bracket 29 in the keyboard section of the machine and the lower end of the lever 28 is pivotally attached to the link 20. It is, therefore, evident that each time the link 20 is actuated by reason of the pressure piece 25 corresponding longitudinal movement will be imparted to the detent bar 27 unless such movement is prevented by means now to be set forth. Arranged in the rear of the coin holders of the magazine 13, as seen best in Fig. 2, are a plurality of fingers 30, the lower ends thereof being bent forward and adapted to partially enter adjacent coin holders through slots in the back portions of the latter. One of the fingers 30 is provided for each coin holder and each finger is actuated by a spring 31 to enter the coin holder when the coins in the latter become nearly exhausted, say when only two coins are left in the receptacle. The entering action of one or more of the fingers 30 on depletion of the coins in the magazine 13 causes the finger or fingers, as the case may be, to engage the notches 27' of the detent bar 27, which notches are adjacent to the particular fingers. Thus it is that when the holder of coins is nearly exhausted and requires replenishment the bar 27 becomes automatically locked in the now obvious manner set forth and the operator is informed of the condition of the contents of the magazine 13 owing to the fact that upward movement on the pressure piece or handle 25 is resisted and prevented, as well as operation of handle C, when locking of the bar 27 takes place. The member 27, therefore, insures attention to the matter of replenishment.

*Locking dog disablement features.*

I have provided three different instrumentalities whereby to render the locking dog 17 inactive or ineffective. These will now be briefly set forth.

The operation of the disabling or non-pay key D has been presented above and Fig. 3 shows that the lever 11 has one end thereof connected with a lifting link 32, the lower extremity of which is connected with the dog 17. A spring 33 attached to the link 32 is preferably used to force the dog 17 into engagement with the abutment 16. The spring may be dispensed with, however. It will be evident from the foregoing that when the key D is depressed the link 32 is lifted so as to release the abutment 16 from the dog 17. Thus each time the paying section B of the machine is disabled or rendered inoperative either for a single transaction of the accounting machine A or for some length of time, the actuator 2 is maintained released from the dog 17.

Should the coin magazine 13 be removed from the paying section B of the machine, as is frequently done to place the contained money in safety over night, the actuator 2 is automatically released from the dog 17. This is accomplished by a slide 34, seen in Fig. 3, as longitudinally movable on a frame piece of the accounting machine A. The slide is normally impelled toward the magazine 13 by a spring 35 but the impelled movement can not take place while the magazine is in position because a stud 36 on the magazine engages the front end of the slide 34. When the magazine is removed the stud 36 is disengaged from the slide 34 and likewise removed as an obstacle to the movement of the slide whereupon a lateral pin 37 projecting from the rear end of the slide 34 operates along a cam cut away portion 11$^a$ of the lever 11, tilts the lever and raises the slide 32 and the dog 17.

Should the operator not wish to replenish the supply of coins in a holder immediately he is advised of depletion of the quantity of coins in the holder, by inability to unlock the machine through the action of the detent bar 27, he may depress a special release key 38 having a notch 39 to engage the keyboard plate. The release key 38 is engageable at its lower end with a lever 40 connected to the lifting link 32 and a depression of the key 38 rocks the lever 40 and elevates the link 32. In this manner the link 32 is operated to lift the dog and release the shaft 2 whereupon a transaction which has been started by being set up on the keys of the accounting machine A, momentarily stopped through the action of the detent bar 27, is permitted to be completed by the operator or operators, if two are using the machine, by the simple actuation of the key 38.

Figure 4:
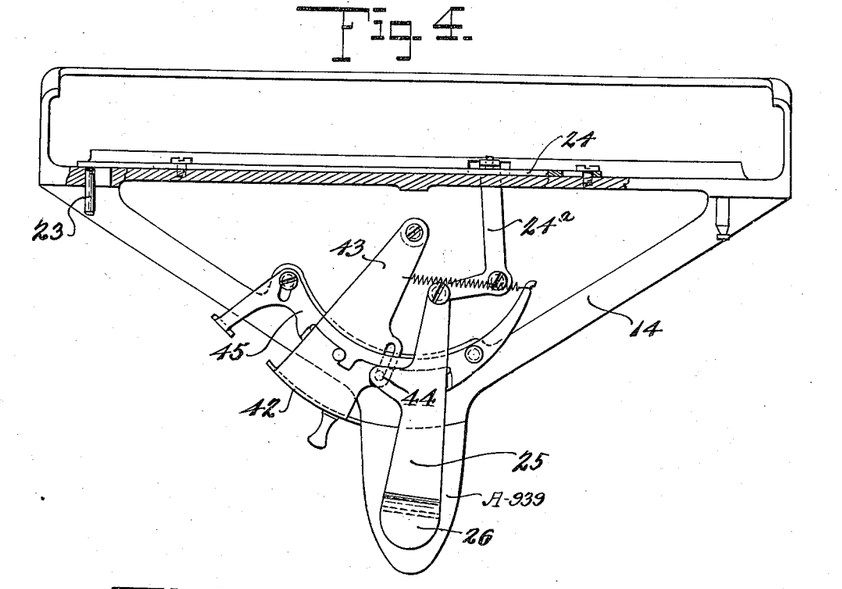
Fig. 4 is a rear view of the money discharge chute showing the parts of the control mechanism carried thereby.
Figure 5:
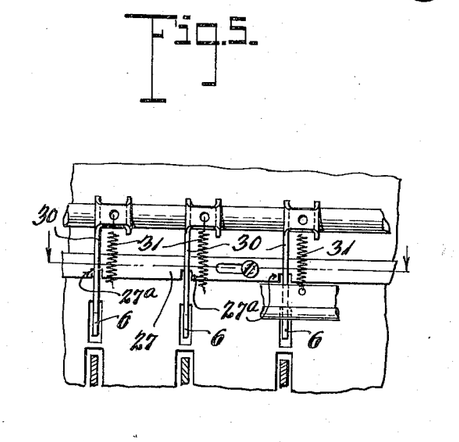
Fig. 5 is a fragmentary view showing more clearly the locking fingers coöperative with the locking bar, which fingers are controlled by depletion of coins in the money holder.
Figure 6:
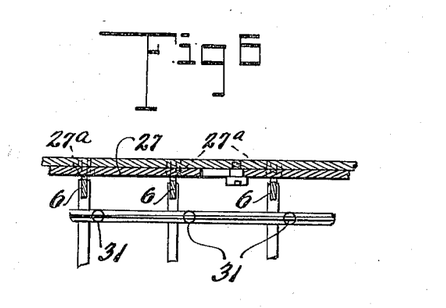
Fig. 6 is a horizontal sectional view of the parts of Fig. 5.

Figs. 1 and 4 show that the money discharge chute 14 is equipped with a gate or closure 42 with means to lock said closure in an inactive or open position, substantially in accordance with the construction set forth in White Letters Patent No. 1,145,727 issued July 6, 1915. This closure 42 is carried by a sort of pivoted hanger 43, the latter being formed with a projection having a pin and slot connection at 44 with the pressure piece or handle 25 previously described. The relative arrangement of the parts 25 and 43 is such that when the latter is moved into inactive position and there locked by the locking latch plate 45 the handle or pressure piece 25 is moved into operative position, where it is readily operable by the hand of the operator which raises and engages over the envelop chute $A^{939}$ the envelop which is to receive the money discharged from said chute.

I do not wish to be restricted to the particular association of the parts 25 and 43 because while the coaction of these parts is advantageous when a machine is equipped with the closure 42, said closure might be readily dispensed with.

It is evident that the paying out mechanism or section B of the machine may be considered a special functioning mechanism associated with the accounting machine for operation conjointly therewith by the main actuator thereof.

It is notable that the key 38 is not only useful when operated as above described, but it constitutes an instrumentality to render the entire second operator controlling devices inactive whenever desired.

Having thus described my invention, what I claim as new and desire to secure by Letters Patent is:

1. In combination, an accounting machine comprising a main actuator and a special functioning mechanism associated with the accounting machine to operate with the latter as an incident to the operation of said main actuator, lock means normally preventing actuation of said main actuator, and a controlling device adapted to be operated manually from the special functioning mechanism to release said lock means.

2. In combination, an accounting machine comprising registering mechanism and a main actuator, a paying section associated with said accounting machine and including mechanism for paying out money, a locking device for said main actuator, and a pressure piece on the paying section manipulable as an incident to receiving money paid out by said section, whereby to release said lock means.

3. In combination, an accounting machine embodying manipulative predetermining devices, registering mechanism and a main actuator, said machine adapted to be operated by one operator, a paying out mechanism associated with said accounting machine and adapted to pay out money under the control of operation of the accounting machine, a normally active locking device for the main actuator to prevent movement thereof, and a manual device associated with the paying out mechanism for control by a second operator to release the locking device for the main actuator only when the second operator so desires.

4. In combination, an accounting machine embodying manipulative predetermining devices, registering mechanism and a main actuator, said machine adapted to be operated by one operator, a paying out mechanism associated with said accounting machine and adapted to pay out money under the control of operation of the accounting machine, a locking device for the main actuator, a manual device associated with the paying out mechanism for control by a second operator to release the locking device for the main actuator only when the second operator so desires, the paying out mechanism including a money magazine, and means operable as an incident to depletion of money in said magazine arranged to coact with the manual device aforesaid to advise an operator of the depleted condition of the money magazine.

5. A paying out mechanism comprising a money magazine and devices for ejecting money therefrom, a pressure piece associated with said mechanism, a detent associated with the money magazine, devices operable as an incident to depletion of money in said magazine for locking said detent against movement, and means connecting the detent with the pressure piece whereby movement of the pressure piece is prevented when the detent is locked so as to advise an operator of a condition of depletion of money in the magazine.

6. A paying mechanism comprising a money magazine, a money discharge chute therefor, and money ejecting instrumentalities, a pressure piece manually operable and carried by said chute, a detent bar adjacent to the money magazine, devices on the money magazine operable incident to depletion of money therein to lock said detent bar against movement, and means connecting the pressure piece aforesaid with the detent bar whereby the detent bar will be actuated by the pressure piece unless the detent bar is locked.

7. In combination, an accounting machine, a paying out mechanism coöperative therewith, means to lock the accounting machine normally against operation, means for rendering the paying out mechanism inactive so far as coöperation with the accounting machine is concerned, and means to unlock the accounting machine incident to rendering the paying out mechanism inactive.

8. In combination, an accounting machine, a paying out mechanism coöperative therewith, means to lock the accounting machine normally against operation, means for rendering the paying out mechanism inactive so far as coöperation with the accounting machine is concerned, means to unlock the accounting machine incident to rendering the paying out mechanism inactive, and a manual device forming a part of the paying out section or mechanism aforesaid and also controlling said locking means.

9. In combination, an accounting machine, a paying out mechanism coöperative therewith, means to lock the accounting machine normally against operation, means for rendering the paying out mechanism inactive so far as coöperation with the accounting machine is concerned, means to unlock the accounting machine incident to rendering the paying out mechanism inactive, a manual device forming a part of the paying out section or mechanism aforesaid and also controlling said locking means, and a manual device on the accounting machine operable to release the lock means aforesaid and permit operation of the accounting machine.

10. In combination, an accounting machine, a paying out mechanism coöperative therewith, means to lock the accounting machine normally against operation, means for rendering the paying out mechanism inactive so far as coöperation with the accounting machine is concerned, means to unlock the accounting machine incident to rendering the paying out mechanism inactive, a manual device forming a part of the paying out section or mechanism aforesaid and also controlling said locking means, a manual device on the accounting machine operable to release the lock means aforesaid and permit operation of the accounting machine, said paying out mechanism involving a money magazine, and automatic means whereby on removal of said money magazine the said locking means for the accounting machine is released.

11. In combination, an accounting machine comprising a main actuator, a paying out mechanism including a detachable money magazine, locking means for said main actuator normally preventing operation of the accounting machine, and means to release said locking means on detachment of the magazine from the paying out mechanism.

12. In combination, an accounting machine comprising a main actuator, a paying out mechanism including a detachable money magazine, locking means for said main actuator normally preventing operation of the accounting machine, means to release said locking means on detachment of the magazine from the paying out mechanism, mechanism to compel conjoint operation of the accounting machine and paying out mechanism, and means to disable the paying out mechanism and to simultaneously release the accounting machine from said locking means.

13. In combination, an accounting machine comprising a main actuator, a paying out mechanism including a detachable money magazine, locking means for said main actuator normally preventing operation of the accounting machine, means to release said locking means on detachment of the magazine from the paying out mechanism, mechanism to compel conjoint operation of the accounting machine and paying out mechanism, means to disable the paying out mechanism, and to simultaneously release the accounting machine from said locking means, and still other means for releasing the accounting machine at will without effecting actuation of parts of the paying out mechanism.

14. In combination, an accounting machine comprising a main actuator, locking means for said actuator, a paying out mechanism associated with said machine to be conjointly operated thereby, said paying out mechanism involving a removable money discharge chute, a manual control device on said chute, and connections intermediate said control device and the locking means for said main actuator whereby the locking means may be released, said connections being such as to permit removal and replacement of the discharge chute and corresponding disengagement and reëngagement of elements of said connections.

15. In combination, an accounting machine, a main actuator therefor, a locking device for said main actuator, a paying out mechanism adapted to be operated conjointly with the accounting machine and by said main actuator, said paying out mechanism comprising a money discharge chute, a closure for said chute, a control member on the chute connected with the locking device of said main actuator whereby to release the latter, and a connection between said chute closure and said control member whereby said parts are rendered alternatively operative.

16. In combination, an accounting machine, a main actuator therefor, a locking device for said main actuator, a paying out mechanism adapted to be operated conjointly with the accounting machine and by said main actuator, said paying out mechanism comprising a money discharge chute, a closure for said chute, a control member on the chute connected with the locking device of said main actuator whereby to release the latter, a connection between said chute closure and said control member whereby said parts are rendered alternatively operative, and an envelop chute connected with said discharge chute removable to permit said closure to close the discharge chute and so disposed that the control member is adjacent thereto for the purpose described.

17. In a paying machine, the combination with the money magazine thereof, means detachably holding said magazine in place, and a main actuator therefor, of lock means preventing operation of said actuator, and means operable to release said lock means incident to detachment of said magazine.

18. In a paying machine, the combination with the money magazine thereof, means detachably holding said magazine in place, and a main actuator therefor, of lock means preventing operation of said actuator, means operable to release said lock means incident to detachment of said magazine, and means to release said lock means at will.

19. In a paying machine, the combination with the money magazine thereof, means detachably holding said magazine in place, and a main actuator therefor, of lock means preventing operation of said actuator, a removable money discharge chute, a manual control member on the chute to release said lock means, connections between said manual control member and the lock means made separable to readily separate and engage on removal and replacement respectively of said chute.

20. In a paying machine, the combination with the money magazine thereof, means detachably holding said magazine in place, and a main actuator therefor, of lock means preventing operation of said actuator, a removable money discharge chute, a manual control member on the chute to release said lock means, connections between said manual control member and the lock means made separable to readily separate and engage on removal and replacement respectively of said chute, and a closure for said chute adapted to operate the said manual member to shift the latter to and from position of use.

21. In combination, an accounting machine embodying manipulative predetermining devices, registering mechanism and a main actuator, said machine adapted to be operated by one operator, a paying out mechanism associated with said accounting machine and adapted to pay out money under the control of operation of the accounting machine, means associated with the paying mechanism whereby a second operator at the paying mechanism is enabled to control the operation of the accounting machine, and a device operable at will to render the last named means inoperative.

22. In combination, an accounting machine embodying manipulative predetermining devices, registering mechanism and a main actuator, said machine adapted to be operated by the operator, a paying out mechanism associated with said accounting machine and adapted to pay out money under the control of operation of the accounting machine, means associated with the paying mechanism whereby a second operator at the paying mechanism is enabled to control the operation of the accounting machine, means to disable the paying mechanism, and means to disable said second operator control means.

23. In combination, an accounting machine embodying manipulative predetermining devices, registering mechanism and a main actuator, said machine adapted to be operated by the operator, a paying out mechanism associated with said accounting machine and adapted to pay out money under the control of operation of the accounting machine, means associated with the paying mechanism whereby a second operator at the paying mechanism is enabled to control the operation of the accounting machine, means to disable the paying mechanism, and means to disable said second operator control means, as an incident to disabling of the paying mechanism and independently of disablement of said paying mechanism.

24. In a machine for paying out money, a paying mechanism, an actuator for the operation thereof, an envelop receiving part on said mechanism, means for normally preventing the action of the actuator, and means adapted to be operated to release the actuator as an incident to application of an envelop to said receiving part.

25. In a payroll machine, the combination of accounting mechanism, paying mechanism operable in conjunction therewith and comprising an envelop receiving chute, an actuator for the accounting mechanism, lock means normally preventing operation of said actuator, and a device on the paying mechanism arranged to be moved incident to the application of an envelop to said chute to thereby release said lock means.

26. In combination, an accounting machine, lock means to prevent effective operation thereof, a paying mechanism to function conjointly with the accounting machine, means to render the accounting machine operable and the paying mechanism inoperable, and other means coöperative with the lock means to render both the accounting machine and paying mechanism operable.

27. In combination, an accounting machine, lock means to prevent effective operation thereof, a paying mechanism to function conjointly with the accounting machine, means to render the accounting machine operable and the paying mechanism inoperable, and other means on the accounting machine coöperative with the lock means to render both the accounting machine and paying mechanism operable, and still other means on the paying mechanism to control the lock means to render the accounting and paying means operable together.

In testimony whereof I affix my signature.

MILES H. MANN.

Copies of this patent may be obtained for five cents each, by addressing the "Commissioner of Patents, Washington, D. C."